J. C. BONNER.
VEHICLE ALINING AND STORING MEANS.
APPLICATION FILED MAR. 31, 1917.
1,280,143.
Patented Oct. 1, 1918.
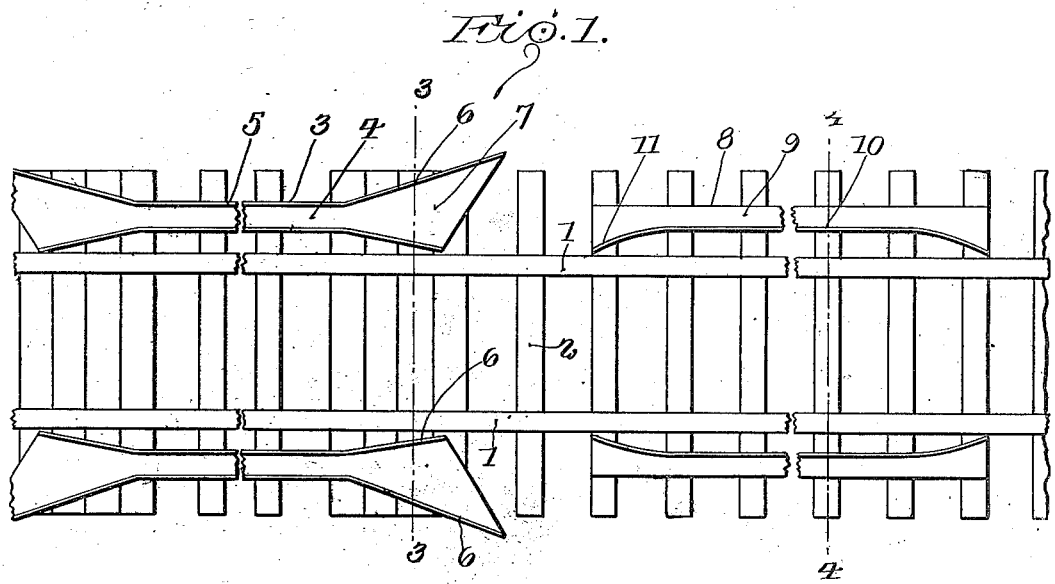
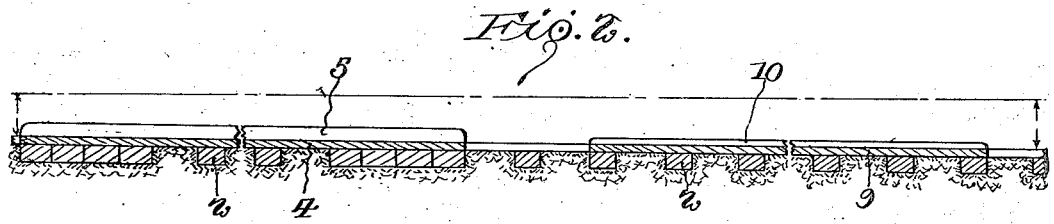
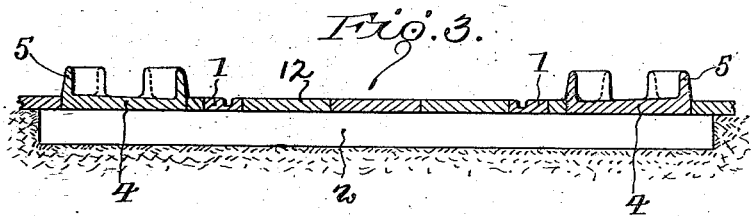
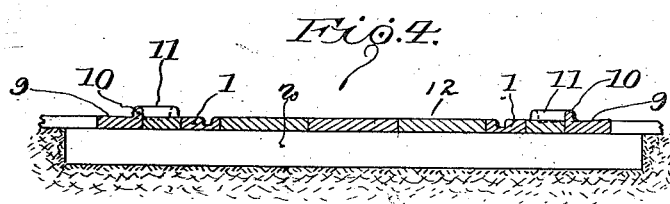
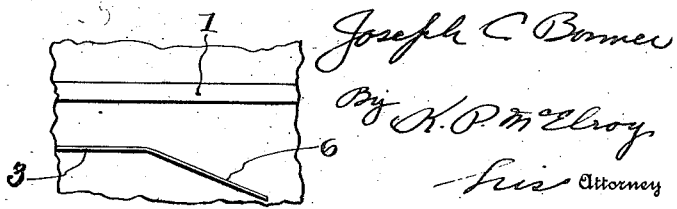

UNITED STATES PATENT OFFICE.

JOSEPH C. BONNER, OF TOLEDO, OHIO.

VEHICLE ALINING AND STORING MEANS.

1,280,143.
Specification of Letters Patent. Patented Oct. 1, 1918.

Application filed March 31, 1917. Serial No. 158,878.

*To all whom it may concern:*

Be it known that I, JOSEPH C. BONNER, a citizen of the United States, residing at Toledo, in the county of Lucas and State of Ohio, have invented certain new and useful Improvements in Vehicle Alining and Storing Means, of which the following is a specification.

This invention relates to vehicle alining and storing means; and it comprises in combination with parallel tracks of a railroad, a guide on the outside of either or both of the tracks, the guide provided with means, advantageously an upward and outwardly projecting or flaring end adapted to be engaged by the wheels of the vehicle to be positioned with respect to the tracks, such end preliminarily directing the wheels along the guide, the guide being further provided with means along its length, advantageously, a substantially vertical flange, to engage the wheels and keep them spaced the desired distance from the rail; and it comprises more particularly a pair of guiding means in combination with parallel tracks of a railroad, the guiding means comprising a pair of subtracks having at one or both ends outwardly flaring portions which have intermediate their ends a continuous member adapted to maintain the wheels of the vehicle astraddle the track in such a position as will permit a flat railroad car to be driven beneath it; and the invention still further comprises in combination with the guides, a supplemental pair of storing tracks each of which is in longitudinal alinement with a guide and each of which has a flaring end, the storage tracks advantageously being spaced from the guides to permit vehicles to be driven on the guides from the ends adjacent the storing tracks; all as more fully hereinafter set forth and as claimed.

In transporting freight one of the main problems is the loading and unloading of the goods. Usually the freight is delivered in a road wagon to the freight terminal and there the freight is unloaded and packed in the freight cars. When the freight is delivered to its freight terminal destination, it is then transferred in bulk to road vehicles and delivered to its ultimate destination. In another application, Serial No. 867,865, filed October 21, 1914, I have shown and described a transportation system in which the road wagon is of wider gage than the standard freight car, and in which the arrangement and combination of the road wagon and freight car are such that the freight car may be straddled by the road vehicle and the road vehicle elevated to a point where its wheels are above the track level for transportation. Usually several road vehicles are loaded upon one flat freight car and many such road vehicles are loaded upon a train.

Under certain conditions, particularly where numerous road wagons are to be loaded upon the freight cars, it is a difficult matter to properly position road wagons with respect to the freight car so that the wagons may be drawn upon the cars or the cars drawn under the wagons.

The present invention provides means for properly alining the road wagons with respect to the cars. While one of the main advantages of the present invention is its use in combination with railroad cars, I may of course use it in combination with power driven vehicles such, for instance, as I have described and claimed in my copending application Serial No. 186,983, filed August 18, 1917, in which event tracks are provided for the power driven vehicle.

It is of course advantageous that there shall be very little clearance between the road wagon and the carrying car, so that the gage of the road wagon need not be unnecessarily increased over that of the car. It is obvious that when there is this small clearance, the loading of the road vehicle upon the carrying cars will be greatly facilitated if the road wagons are properly alined with respect to the tracks.

Along side of one or both of the tracks of a railroad and properly spaced from the outside thereof, I provide specifically what may be termed a subtrack. This subtrack may be a channel iron having a base and substantially vertical longitudinal sides. The ends of these sides are flared so that there is, so to speak, at each end a wide path into which the road wagon may be easily guided. The narrow intermediate portions of these channel irons serve to further guide and hold the vehicle in proper position. The storage tracks may advantageously be angle irons having inwardly flaring ends and are usually much longer than the guides. They are spaced away from the guides only a sufficient distance to permit a wagon to be loaded onto the guides between the storage tracks and the guides. If the guides and storage tracks are used in connection with tracks mounted upon ties and if the road bed is not level with the ties, I usually use a pair of supplemental tracks connecting the two but not having any flanges. The guides and tracks need not necessarily have the wheel traveling surface integral with the flanges and flaring ends. When the railroad tracks are inset, for instance, in a concrete foundation, it is only necessary that the guides and storage tracks be provided with the vertical portions, the road bed forming the wheel traction surface.

In the accompanying drawings showing a specific embodiment of my invention,

Figure 1 is a top plan view showing the alining guides and storage tracks in proper position with respect to the railroad tracks;

Fig. 2 is a center longitudinal sectional view of Fig. 1;

Fig. 3 is a transverse sectional view on the line 3—3 of Fig. 1;

Fig. 4 is a transverse sectional view on the line 4—4 of Fig. 1; and

Fig. 5 is a detail plan showing one of the guides having only one vertical flange.

Referring to the drawings, the railroad tracks 1 are supported by the ties 2 and, when two guides are used, each of them is arranged parallel to, but outside, of a track. The guides 3 are spaced a distance apart corresponding to the distance between the wheels of the road vehicle. These guides may be in the form of channel bars as shown in Figs. 1 to 4, inclusive, or they may be in the form of vertical strips, as is shown in Fig. 5. The intermediate or main section 4 of each of the guides when mounted upon the ties, as is usual, forms the traction surface, and the vertical wall 5 extending from the intermediate section forms intermediate guiding members between the ends of the guide as a whole. At the ends of the guides, when two vertical walls are used, these walls flare outwardly as at 6, forming a wide entrance or path 7 into which the vehicle may be easily driven. As the vehicle moves toward the center of the guide, the diverging walls force the wheels into the narrower intermediate section and thereby aline the vehicle with respect to the tracks 1. If only one guide is used, the driver should be careful to bear toward the wall so that the off wheels not on a guide will be properly positioned with respect to the off track. The storage tracks 8 are spaced a slight distance from the alining guides in order to permit vehicles to drive into the ends of the guides adjacent the storage tracks. These storage tracks comprise a base or traction surface 9 (when used on ties and when used when the road bed is not level with the ties). Projecting from the traction surface 9 is a vertical wall 10 having outer ends 11 flaring toward the railroad tracks. Each of the storage tracks is in longitudinal alinement with one of the guides or channel bars 3.

The ends of the storage tracks are not necessarily widened or flared to as great an extent as the ends of the alining guides since there is not much possibility of the vehicles running out of alinement in passing the short distance from the guides to the storage tracks.

The vertical walls of the guides may be and usually are of a greater height than those of the storage tracks (compare Figs. 3 and 4). It is necessary to construct the walls of the alining guides of appreciable height in order to effect the proper alinement of the vehicles with respect to the railroad tracks, but I find it advantageous to restrict the height of the walls of the storage tracks as much as possible to permit vehicles to drive across them. As is shown in Figs. 3 and 4 grooved rails, such as are used in the construction of city car tracks, are best employed in carrying out this invention and the space between the rails is paved with any suitable material, as at 12. When a vehicle is driven into position it is at times necessary to drive the horses into the space between the guides and storage tracks and this pavement facilitates the travel of the vehicle when loaded or unloaded on or off the guides.

The operation of this invention is obvious. The guides steer the front wheels and the rear wheels of the vehicle so that it is properly positioned over the railroad tracks. The vehicle may then be drawn to the storage tracks and left there until the railroad freight car is driven thereunder.

This invention is best adapted for use in stations where the amount of freight handled is considerable. The alining guide and the storage tracks are best arranged upon a siding in order that the wagons can be stored for any length of time without interfering with the railroad schedule. As is shown in Fig. 3, the base portions of the guides are preferably inclined toward the railroad tracks which facilitates guiding. Advantageously the guides are at a slightly higher level than the storage tracks to facilitate the delivery of the loaded wagons from the guides to the storage tracks.

What I claim is:—

1. The combination with parallel tracks of a railroad, of vehicle alining means comprising a guide on the outside of each track, the guide provided with a flaring end adapted to be engaged by the wheels of the vehicle to preliminarily direct the wheels along the guide and the guide being further provided with means along its length to engage the wheels and keep them spaced the desired distance from the rail.

2. The combination of railroad tracks and alining means of claim 1 together with a pair of longitudinal storing tracks.

3. A construction in accordance with claim 2 in which the longitudinal storing tracks are spaced from the guides.

4. A construction in accordance with claim 1 in which one guide is used.

5. A construction in accordance with claim 1 in which one storage track is used.

6. A construction in accordance with claim 2 in which one guide is used.

7. A construction in accordance with claim 2 in which one storage track is used.

8. A construction in accordance with claim 3 in which one guide is used.

9. A construction in accordance with claim 3 in which one storage track is used.

10. The combination with parallel tracks of a railroad, of vehicle alining means comprising a guide having a base portion and two parallel vertical walls, the vertical walls at the ends of the guides flaring outwardly to provide a wider path for the vehicle than the path intermediate the flaring ends.

11. In combination, a rail track, and means for positioning a wagon with respect to said track with the wheels of the wagon equally spaced from the rails of said track, said means comprising a member having a base portion and a vertically disposed wall extending above the base portion.

12. In combination, a railroad track, guides positioned upon each side of said track and adapted to aline a vehicle whereby the wheels of the vehicle will be equally spaced from the rails of the track, said guides comprising base portions and vertically disposed walls extending above said base portions.

13. In combination, a railroad track, and guides positioned upon each side of said track adapted to aline the vehicle whereby the wheels of the vehicle will be equally spaced from the rails of the track, and means provided at the ends of the guides to facilitate alining of the vehicle, each of said guides comprising a base or tread portion and a vertical wall extending above said base or tread.

14. In combination, a railroad track, channel bars arranged upon each side of the track at an equal distance from the rails, the ends of the channel bars being widened to permit a wagon to be driven into the channel bars.

15. In combination, a railroad track, means for alining a vehicle with respect to said track, and storage tracks comprising rails equally spaced from the rails of the track and in alinement with said alining means.

16. In combination, a railroad track, means for alining a vehicle with respect to said track and a storage track comprising an angle bar arranged upon each side of the track, spaced from the rails of the same and in alinement with said alining means.

17. In combination, a railroad track, means for alining a vehicle with respect to said track and a storage track comprising an angle bar arranged upon each side of the track, and in alinement with said alining means, the ends of said angle iron being widened to facilitate the passing of vehicles thereon.

In testimony whereof I affix my signature.

JOSEPH C. BONNER.